ies Patent [19]

United States Patent [19]

Orvik

[11] 4,257,899
[45] Mar. 24, 1981

[54] METHOD FOR REMOVING CHLOROPICRIN FROM AN AQUEOUS MEDIUM

[75] Inventor: Jon A. Orvik, Danville, Calif.

[73] Assignee: The Dow Chemical Company, Midland, Mich.

[21] Appl. No.: 73,778

[22] Filed: Sep. 10, 1979

[51] Int. Cl.³ .............................................. C02F 1/72
[52] U.S. Cl. ..................................... 210/758; 210/903
[58] Field of Search ........................... 210/50, 59, 63 R

[56] References Cited

U.S. PATENT DOCUMENTS 3,909,408  9/1975  Ishida et al. ............................ 210/59
4,012,321  3/1977  Koubek .............................. 210/63 R

OTHER PUBLICATIONS

"Chloropicrin", Product Information Bulletin of Niklor Chemical Co., Inc., Long Beach, Calif.

Primary Examiner—Thomas G. Wyse
Attorney, Agent, or Firm—J. W. Ambrosius

[57] ABSTRACT

A method for destroying chloropicrin in an aqueous medium contaminated with chloropicrin which comprises contacting the aqueous medium with a sufficient amount of an alkali metal sulfite for a sufficient period of time to convert the chloropicrin to an alkali metal chloride and to nitromethane disulfonic acid or a salt thereof, whereby the aqueous medium is rendered substantially free of chloropicrin.

4 Claims, No Drawings

METHOD FOR REMOVING CHLOROPICRIN FROM AN AQUEOUS MEDIUM

BACKGROUND OF THE INVENTION

Chloropicrin or nitrochloroform is useful as a soil fumigant to control certain fungal diseases of plants and soil infestations of nematodes. Although almost insolubile in water, even very low concentrations of chloropicrin in water are irritating to the eyes and respiratory tract. Concentrations as low as one part per million of chloropicrin can cause a lachrymatory effect. In addition, contamination by chloropicrin may interfere with the recycling of an aqueous industrial process stream where recycling of the water is desirable. Therefore, it is preferable to remove even small amounts of chloropicrin from industrial waste streams or other contaminated water prior to recycling or discharge into the environment.

Chloropicrin may be removed from waste streams by steam-stripping. This procedure, although effective, requires the use of a considerable amount of energy to produce the steam required for the stripping operation. With the costs of energy increasing, it would be desirable to use a less energy intensive method for removing the chloropicrin.

SUMMARY OF THE INVENTION

The invention is directed to a chemical method of destroying chloropicrin in an aqueous medium, such as an industrial waste stream. The method of the invention comprises contacting the contaminated aqueous medium with a sufficient amount of a sulfite of an alkali metal for a sufficient period of time to convert the chloropicrin to an alkali metal chloride and to nitromethane disulfonic acid or an alkali metal salt thereof, whereby the aqueous medium is rendered substantially free of chloropicrin. At low concentrations the decomposition products of chloropicrin are relatively innocuous and additional treatment of the medium is usually unnecessary. In carrying out the method of the invention, the alkali metal sulfite may be added directly to the contaminated aqueous medium, or alternatively the sulfite may be generated in situ by the reaction of a strong base with an alkali metal bisulfite, alkali metal metasulfite, or aqueous sulfur dioxide. As used herein, the term "strong base" refers to a base capable of releasing hydroxyl ions in water, such as sodium hydroxide, potassium hydroxide, ammonium hydroxide, or the like.

DETAILED DESCRIPTION OF THE INVENTION

In carrying out the method of the invention sodium sulfite has been found to be satisfactory for use as the alkali metal sulfite and represents one preferred embodiment. The alkali metal sulfite may be added to the contaminated water as a solid or as an aqueous solution. Generally, in order to completely decompose the chloropicrin at least about 3.3 moles of alkali metal sulfite must be added per 1 mole of chloropicrin. The time required to decompose the chloropicrin will vary depending upon conditions well understood by those skilled in the art. For example, the time required to substantially remove the chloropicrin from an aqueous medium will depend upon the amount of contamination, the amount of sulfite added, the temperature of the medium, the presence of other contaminants which may interfere with the reaction, the pH of the medium, etc. The reaction usually is carried out at ambient temperature, but the decomposition of the chloropicrin will proceed satisfactorily at temperatures substantially above or below room temperature. Thus, there is no necessity to heat the aqueous medium during treatment nor is it necessary to cool a hot industrial process stream prior to treatment.

When the sulfite is generated in situ from an alkali metal bisulfite or metasulfite, sodium hydroxide is generally preferred as the strong base, although other strong bases such as potassium hydroxide or ammonium hydroxide can also be used. In generating the sulfite using aqueous sulfur dioxide, sodium hydroxide or potassium hydroxide would be suitable, with sodium hydroxide being preferred.

The reaction will proceed over a broad range of pH from about neutral to strongly basic. Low pH is generally not satisfactory and strongly acid waste streams must have the pH adjusted before the decomposition of the chloropicrin contaminant can be accomplished. Generally, the pH can be adjusted simply by the addition of a sufficient amount of sodium hydroxide to the medium to raise the pH to the desired value. A pH of from about 6 to 14 is usually operable for carrying out the reaction, with a pH above 8 being preferred.

In testing for the presence of chloropicrin in an aqueous medium, a convenient method is by the addition of a moderately concentrated aqueous solution of sodium thiophenoxide to the medium. If chloropicrin is present, the medium will change to an opaque white or become opalescent in the case of lower concentrations.

The following examples will serve to further explain the invention but are not to be construed as a limitation thereon.

EXAMPLE 1

A sample (150 ml) from a waste stream containing about 450-500 ppm of chloropicrin was placed in an Erlenmeyer flask with a magnetic stirrer at room temperature. A saturated aqueous solution of sodium sulfite (3 ml) was added. Within two minutes, a test as described above for the presence of chloropicrin was negative.

EXAMPLE 2

A sample (150 ml) from a waste stream containing about 450-500 ppm of chloropicrin was mixed with 3 ml of 37% sodium bisulfite solution. Within 5 minutes the temperature increased from 68.8° F. to 80.7° F. and the pH dropped from 6.9 to 0.7. A strong test for chloropicrin was obtained using the sodium thiophenoxide method described above. The pH of the mixture was adjusted to 8.5 using 25% sodium hydroxide solution. Within one minute a negative test for chloropicrin was obtained.

What is claimed is:

1. A method for destroying chloropicrin in an aqueous medium contaminated with chloropicrin which comprises contacting the aqueous medium with a sufficient amount of an alkali metal sulfite at a pH of from about 6 to 14 for a sufficient period of time to render the aqueous medium substantially free of chloropicrin.

2. The method of claim 1 wherein the alkali metal sulfite is generated in the aqueous medium by the reaction of a strong base with an alkali metal bisulfite, alkali metal metasulfite or aqueous sulfur dioxide.

3. The method of claim 1 wherein the alkali metal sulfite is sodium sulfite.

4. The method of claim 1 wherein the pH of the reaction mixture is at least 8.

* * * * *